United States Patent
Kelsey et al.

(10) Patent No.: US 9,003,663 B2
(45) Date of Patent: Apr. 14, 2015

(54) REMANUFACTURING OF BEARINGS USING ISOTROPIC FINISHING AND THIN FILM COATINGS

(75) Inventors: Eric Kelsey, Hennepin, IL (US); M. Brad Beardsley, Laura, IL (US); Bao Feng, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 72 days.

(21) Appl. No.: 13/591,704

(22) Filed: Aug. 22, 2012

(65) Prior Publication Data

US 2014/0056550 A1 Feb. 27, 2014

(51) Int. Cl.
*B21D 53/10* (2006.01)
*F16C 33/34* (2006.01)

(52) U.S. Cl.
CPC ........... *F16C 33/34* (2013.01); *Y10T 29/49643* (2015.01)

(58) Field of Classification Search
USPC ............................ 29/898.04, 898.01; 384/565
See application file for complete search history.

(56) References Cited

U.S. PATENT DOCUMENTS

| | | | |
|---|---|---|---|
| 5,503,481 A * | 4/1996 | Hashimoto et al. | 384/569 |
| 5,549,764 A * | 8/1996 | Biltgen et al. | 148/222 |
| 2008/0196793 A1* | 8/2008 | Winkelmann | 148/274 |
| 2010/0233510 A1* | 9/2010 | Sroka et al. | 428/687 |

FOREIGN PATENT DOCUMENTS

| WO | WO9605331 A1 | 2/1996 |
|---|---|---|
| WO | WO 2005-100810 | 10/2005 |

OTHER PUBLICATIONS

Timken "Bearing Repair"< http://www.timken.com/en-us/products/remanufacture/industrial/Documents/Timken%20Bearing%20Remanufacturing%20Paper%20doc.pdf> Ret. Mar. 11, 2014. Metadata Indicates a publication date of 2009.*
Rao, Susen B., Repair via Isotropic Superfinishing of Aircraft Transmission Gears, Gear Technology, May 2009, pp. 44-45.
International Search Report and Written Opinion issued in related PCT Application No. PCT/US2013/046785; report dated Sep. 13, 2013.

* cited by examiner

*Primary Examiner* — Jacob Cigna
(74) *Attorney, Agent, or Firm* — Miller, Matthias & Hull LLP

(57) ABSTRACT

A method and system for processing a bearing component to extend its useful life include using the component in the bearing assembly for a portion of its initial useful life and then removing the component from the bearing assembly. The surface of the removed component is subjected to isotropic finishing, after which a protective wear coating is applied to the surface of the component. Once processed, the used bearing component is reinstalled for use.

17 Claims, 5 Drawing Sheets

US 9,003,663 B2

REMANUFACTURING OF BEARINGS USING ISOTROPIC FINISHING AND THIN FILM COATINGS

TECHNICAL FIELD OF THE DISCLOSURE

The present disclosure relates to bearing assembly reconditioning and, more particularly, relates to a system and method for remanufacturing bearing elements using a combination of isotropic finishing and thin film coating.

BACKGROUND OF THE DISCLOSURE

Friction has been a constant enemy in industry and transportation, and the primary weapon in reducing the effects of friction has long been the bearing assembly. Bearings come in many shapes including ball bearings, roller bearings, needle bearings and others. The main advantage provided by a bearing is to convert what would otherwise be a high-friction sliding interface into a low-friction rolling interface.

However, as much as bearings may assist in the reduction of friction, there is still some degree of wear to the bearing assemblies (rolling elements and races). As such, bearings must periodically be replaced or reconditioned. While certain portions of a bearing assembly may be reused after some processing or relubrication, the rolling elements themselves are typically discarded and replaced. See, for example, U.S. Pat. No. 7,591,107 assigned to Timken, describing the reconditioning of used bearing assemblies by discarding and replacing used races and rolling elements.

From the standpoint of economy, it may indeed be preferable to replace rather than recondition small bearing elements; however, large bearing elements represent a larger investment in terms of material cost and labor, and it may become prohibitively expensive to discard and replace such large components.

In addition to the material and labor costs included in replacing the bearing elements, a reliance on replacements alone also exposes a manufacturer or user to supply chain disruption risks. While it is sometimes possible to simply retain the rolling elements during reconditioning, the already reduced useful life of the rolling elements and the cost of a subsequent tear down often combine to make this option economically unfeasible.

In lieu of successful strategies for reconditioning such rolling elements, many attempts have been made to reinforce new bearings. For example, U.S. Pat. No. 5,503,481, also assigned to Timken, teaches an isotropic polishing process for increasing the useful life of bearing components. The process described in the '481 patent is a multi-step polishing process that increases surface smoothness and thus decreases friction and turning torque. However, the '481 patent does not address the reconditioning of rolling elements once they have become worn. As such, reconditioning under the '481 patent would likely proceed in the same manner as in the contemporaneous '107 patent from the same assignee, i.e., discarding and replacement of rolling elements.

The present disclosure is directed to systems and methods that address one or more of the problems set forth above. However, it should be appreciated that the solution of any particular problem is not a limitation on the scope of this disclosure or of the attached claims except to the extent expressly noted. Additionally, the inclusion of any problem or solution in this Background section is not an indication that the problem or solution represents known prior art except as otherwise expressly noted.

SUMMARY OF THE DISCLOSURE

In accordance with one aspect of the present disclosure; a method is provided for processing a component of a first bearing assembly, the component having an initial useful life, the method including using the component in the bearing assembly for a substantial portion of its initial useful life, removing the component from the bearing assembly, subjecting a surface of the removed component to isotropic finishing, applying a protective wear coating to the surface of the component after isotropic finishing, and installing the coated component into a second bearing assembly.

In accordance with yet another aspect of the present disclosure, a method is provided for extending a useful life of a partially-used component of a bearing assembly. The component has an initial useful life that is less than a useful life of an initially isotropically finished protection coated component. The method comprises subjecting a surface of the partially-used component to isotropic finishing and applying a protective wear coating to the surface of the partially-used component. In this way, the overall useful life of the component is substantially equal to the useful life of an initially isotropically finished protection coated component.

In accordance with yet another aspect of the present disclosure, a reconditioned bearing assembly is provided. The reconditioned bearing assembly includes a bearing race and a reconditioned bearing roller element. The reconditioned bearing roller element has been treated by use for more than 50% of its initial useful life followed by isotropic finishing, coating, and installation into the bearing assembly, such that the reconditioned bearing roller element exhibits a rate of wear in the bearing assembly that is lower than that exhibited by an initially isotropically finish and coated bearing roller element.

Other features and advantages of the disclosed systems and principles will become apparent from reading the following detailed disclosure in conjunction with the included drawing figures.

DETAILED DESCRIPTION OF THE DISCLOSURE

The present disclosure provides a system and method for preparing bearing roller elements such that they exhibit an eventual wear curve that is shallower than both an uncoated bearing wear curve and a coated bearing wear curve. In an embodiment, the roller elements, such as rollers, balls, needles, etc., are used in an uncoated state for a portion of their useful life. The roller elements are then subjected to isotropic super finishing and the application of a thin film carbon-containing coating. An isotropic finish is one in which defects are generally non-directional, in contrast to directional defects such as machine marks. Once such bearings are put into reuse, they unexpectedly experience wear, e.g., pitting fatigue, at an even slower rate than bearings that were coated prior to first use.

Figure 1:
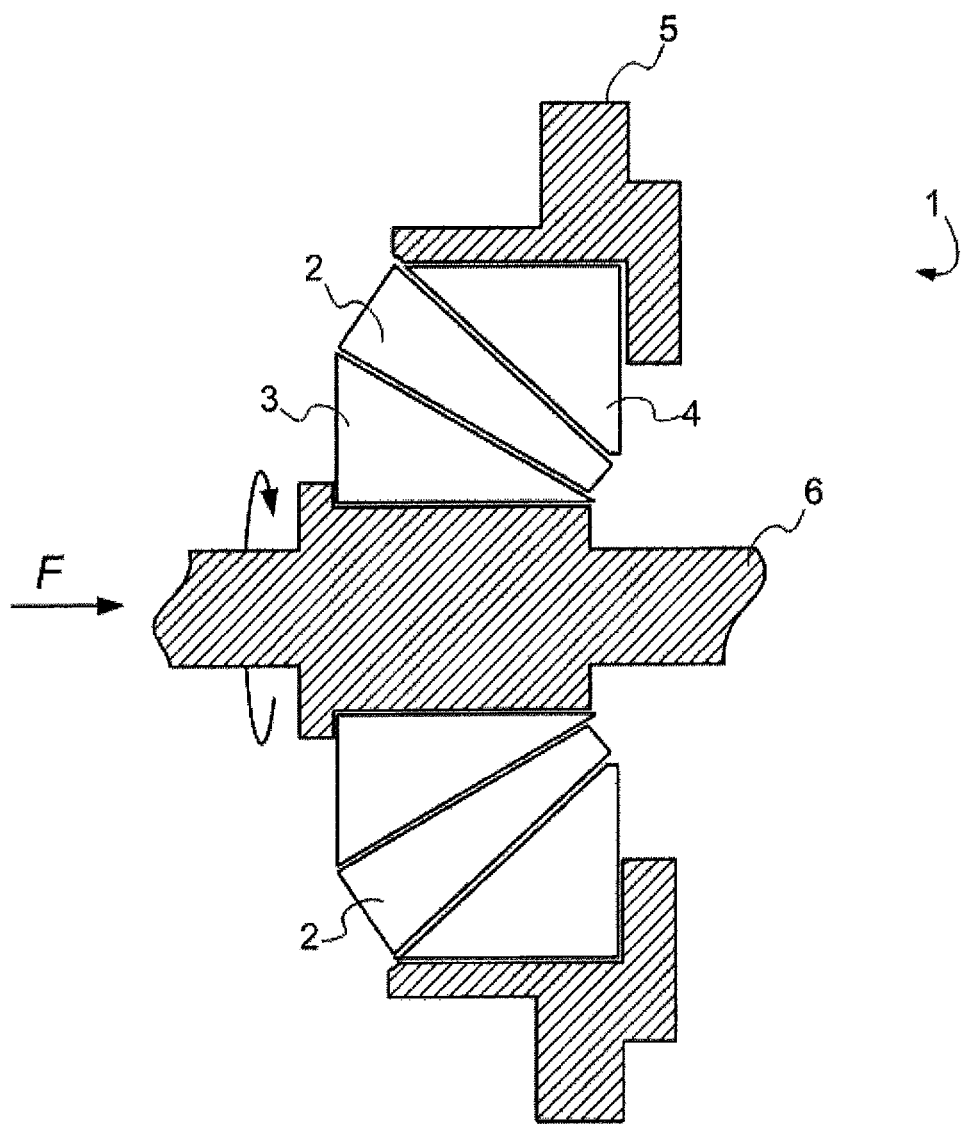
FIG. 1 is a simplified cross-sectional view of a roller bearing assembly and installation environment within which one or more embodiments of the disclosed principles may be implemented.

Turning to the figures, FIG. 1 is a simplified cross-sectional view of a roller bearing assembly and installation environment within which one or more embodiments of the disclosed principles may be implemented. The roller bearing assembly 1 includes a plurality of cylindrical rollers 2 captured between an inner race 3 and an outer race 4. The roller bearing assembly 1 may include other elements not shown, e.g., roller pins or axles, bearing cages or retainers, and so on. The outer race 4 is set into a recess in a bearing hanger or other stationary fixture 5 and constrained from rotating by way of a close fit, while the inner race 3 is pinned or retained by a friction fit on a retaining element such as an axle 6.

In this configuration, when the axle 6 rotates relative to the stationary fixture 5, the cylindrical rollers 2 roll between the inner race 3 and the outer race 4 to provide a rolling contact rather than a sliding contact. Although the illustrated bearing assembly 1 is configured as a thrust bearing to accept axial loads, similar dynamics occur with respect to most bearing types. For example, a ball bearing assembly configured to accept radial loading includes radially facing inner and outer ball races.

Although the use of bearings is a vast improvement over sliding interfaces, roller elements are nonetheless subject to wear and have a limited useful life. Pitting fatigue is a primary life-limiting form of wear. Pitting fatigue wear begins when a slight sliding between adjacent surfaces causes surface yielding, initiating a pit. The pits thus formed will then increase in size due to fatigue, and will eventually affect the function of the bearing. The worn condition of the bearing, if not detected during regular inspection, may eventually manifest as an increase in roughness and/or turning resistance, and one or more rolling elements may eventually fail completely, such as via disintegration, causing a total loss of function.

As one means of fortification against wear, bearing roller elements and/or associated stationary elements may be isotropically finished and coated, as will be described in greater detail later herein. Isotropic finishing modifies the surface finish and/or texture in order to improve performance through reduced galling or wear in applications where sliding may occur. Isotropic finishing in combination with protective coating serves to alter the wear characteristics of the roller elements by decreasing pitting fatigue and extending the useful life of the roller elements.

Figure 2:
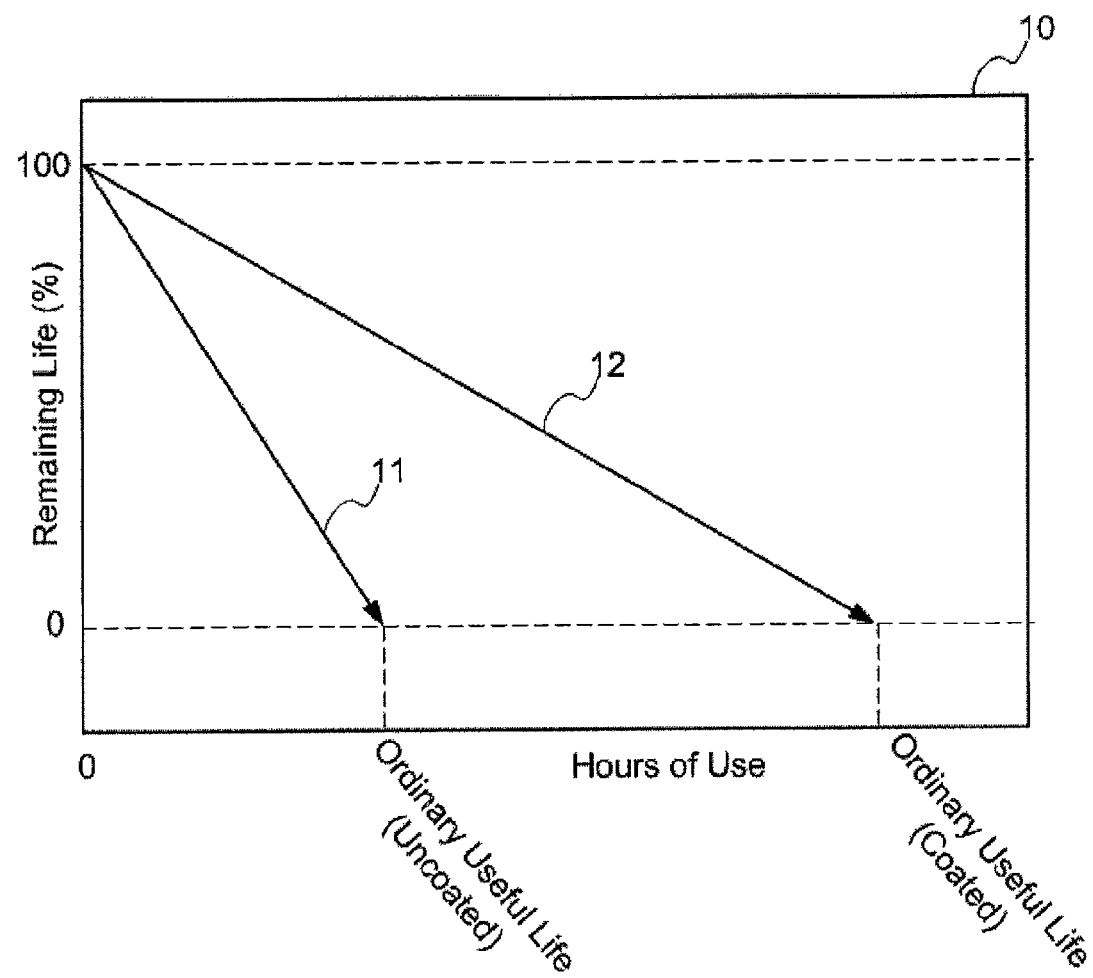
FIG. 2 is a life plot showing typical lifetime wear curves for both coated roller elements and uncoated roller elements.

FIG. 2 is a life plot 10 showing typical lifetime curves for both coated roller elements and uncoated roller elements. In particular, a first curve 11 corresponds to an unfinished, uncoated bearing roller element, while a second curve 12 corresponds to an isotropically finished and protection-coated bearing roller element. As can be seen, in both cases the remaining life of the part decreases as time-in-use increases, with both parts eventually reaching a remaining life of zero. However, the first curve 11 corresponding to the unfinished, uncoated bearing roller element is noticeably steeper, indicating that the unfinished roller is wearing much more quickly throughout its lifetime than the isotropically finished and protection-coated roller.

In an embodiment, an unfinished and uncoated roller element is reconditioned by removal from the host bearing assembly at approximately 75% of its useful life, followed by isotropic finishing and coating of the used roller element. In this way, it has been found that the wear curve of roller elements so treated is even more gradual than the wear curve of an initially isotropically finished and protection-coated bearing roller. In other words, the amount of wear per hour of use for such a roller element is even less than the amount of wear per hour of use for a roller element that was initially isotropically finished and protection-coated.

Figure 3:
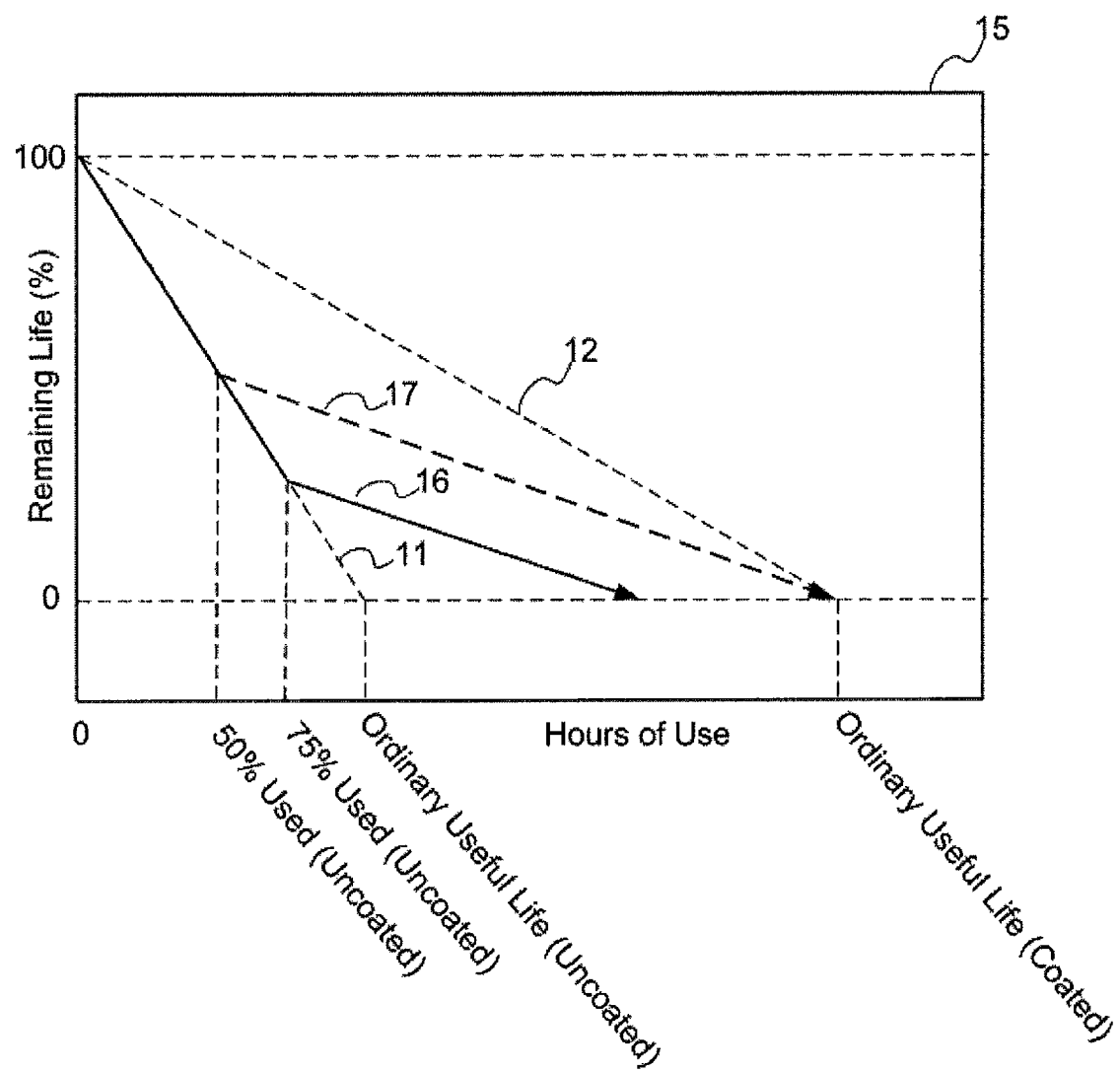
FIG. 3 is a life plot showing lifetime wear curves for both coated roller elements and uncoated roller elements, as well as for a roller element reconditioned in keeping with an aspect of the disclosed principles.

In this regard, FIG. 3 is a second life plot 15 showing lifetime curves for both coated roller elements and uncoated roller elements, as well as for a roller element reconditioned in the foregoing manner. In particular, in addition to the first life curve 11 corresponding to an unfinished, uncoated bearing roller element and the second life curve 12 corresponding to an isotropically finished and protection-coated bearing roller element, the second life plot 15 also shows a third life curve 16 for a reconditioned roller element.

The reconditioned roller element represented by the life curve 16 is one which has been removed from the bearing assembly at approximately 75% of its uncoated lifetime and reprocessed by isotropic finishing and coating. The details of the isotropic finishing and coating will be discussed later below, but the salient feature of the third wear curve 16 is that its slope is shallower than both the first life curve 11 and the second life curve 12. In other words, the rate of wear of the reconditioned bearing is even less than the rate of wear of an initially isotropically finished and coated roller element. While it would have been expected by those of skill in the art that the rate of wear for the reconditioned roller element would simply match that of an initially finished and coated roller element, the reconditioning unexpectedly reduces the rate of wear even further.

Another salient if unexpected feature of the third life curve 16 is that the overall lifetime of the reconditioned roller element, from initial installation when new, to eventual removal after being reconditioned and reinstalled, can be as much as the overall lifetime of the initially isotropically finished and coated roller element depending upon when the element is reconditioned. See, for example, the extent of exemplary life curve 17. Thus, not only does reconditioning in the prescribed manner slow the rate of wear and extend the life of the roller element to some degree, but it actually yields an overall lifetime for an initially unprocessed bearing that substantially matches the lifetime of an initially processed bearing.

Regarding the isotropic finishing, which will be discussed in greater detail with reference to FIG. 4, the roller elements may be processed to have a surface finish on bearing surfaces of about 0.40 to 0.75 micrometers (16 to 30 µin). For isotropic finishing, the parts are then processed in media appropriate to part geometry and material hardness which is within the size range of about 25.4 mm (1 inch) to about 6.35 mm (0.25 inch) (various shapes) with, for example, a 325 grit aluminum oxide at 25% by weight.

The processing procedure for isotropic finishing involves two cycles, namely a cut cycle and a burnish cycle. The cycle time depends upon the initial surface finish and part geometry tolerance. As to the latter, the cycle times should be chosen such that part geometry, e.g., corners, roundness, slopes, openings, etc., remain within tolerance. In an embodiment, the cut or burnish fluid need not be removed prior to adding fluid for the burnish cycle or prior to adding fluid to maintain the pH of the fluid.

The acid used in the cut cycle is one of phosphoric acid and oxalic acid in an embodiment, with a pH value between about 5 and about 6. In a further embodiment, the solution used in the burnish cycle is a slip agent at a pH of about 7 to about 9.

After burnishing, the processed parts are completely rinsed to prevent further etching or erosion, and may be coated with a suitable corrosion-protection product.

Regarding measuring the ideally isotropic finish obtained by the two-cycle processing, when measuring an isotropically finished surface with a measured roughness ≥0.1 µm (4 µin) Ra, a cutoff of 0.8 mm may be used. If the measured roughness is less than 0.1 µm Ra, a cutoff of 0.25 mm may be used. The traverse direction of the measurement surface traces is preferably perpendicular to the direction of any initial machine or directional wear marks.

Once a roller element has been isotropically finished, it is coated with a wear reduction agent. In an embodiment, the wear reduction agent is a carbon-containing coating applied by vapor deposition, fluid deposition, or other suitable means.

Figure 4:
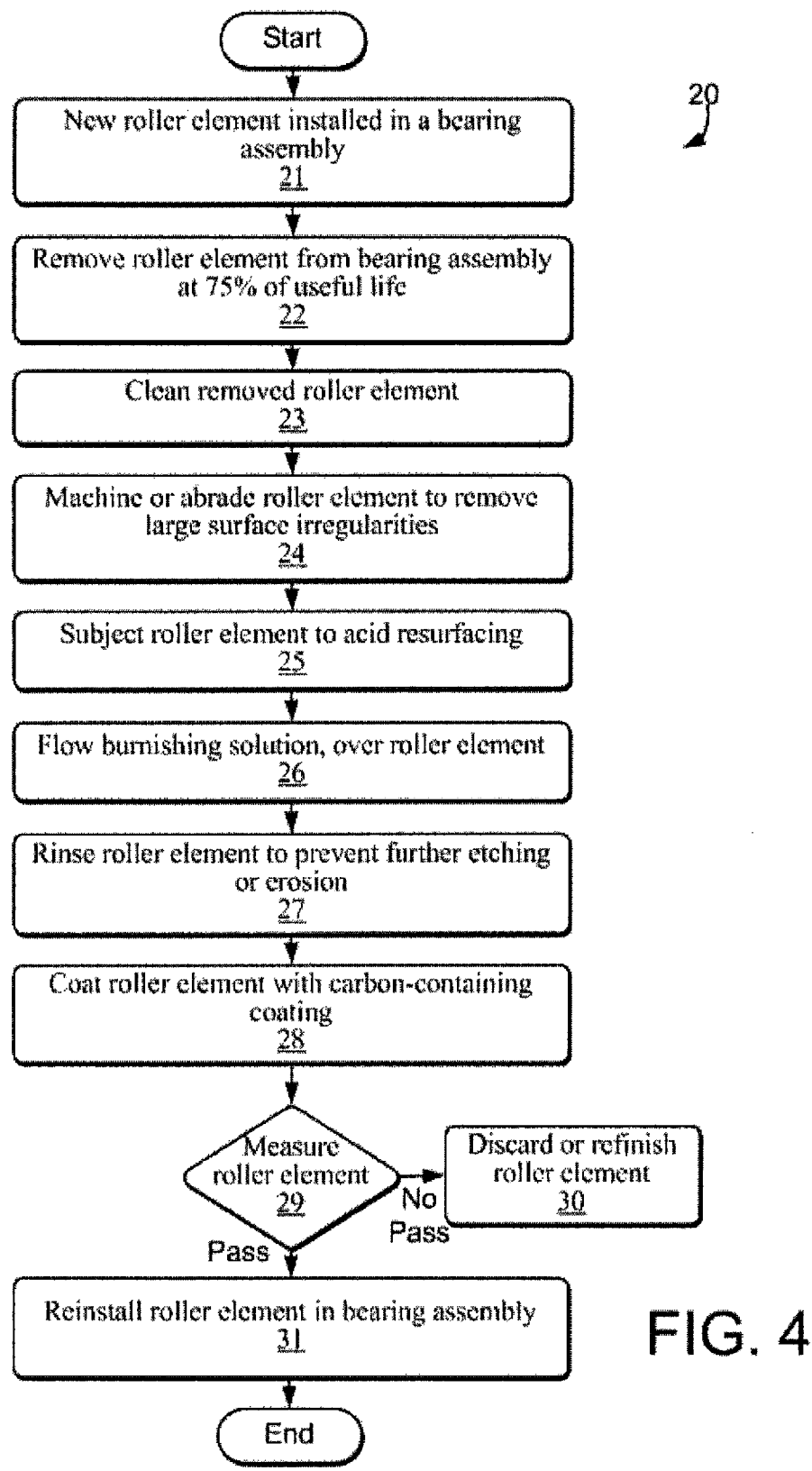
FIG. 4 is a flow chart illustrating a process of bearing treatment according to an embodiment of the disclosed principles.
Figure 5:
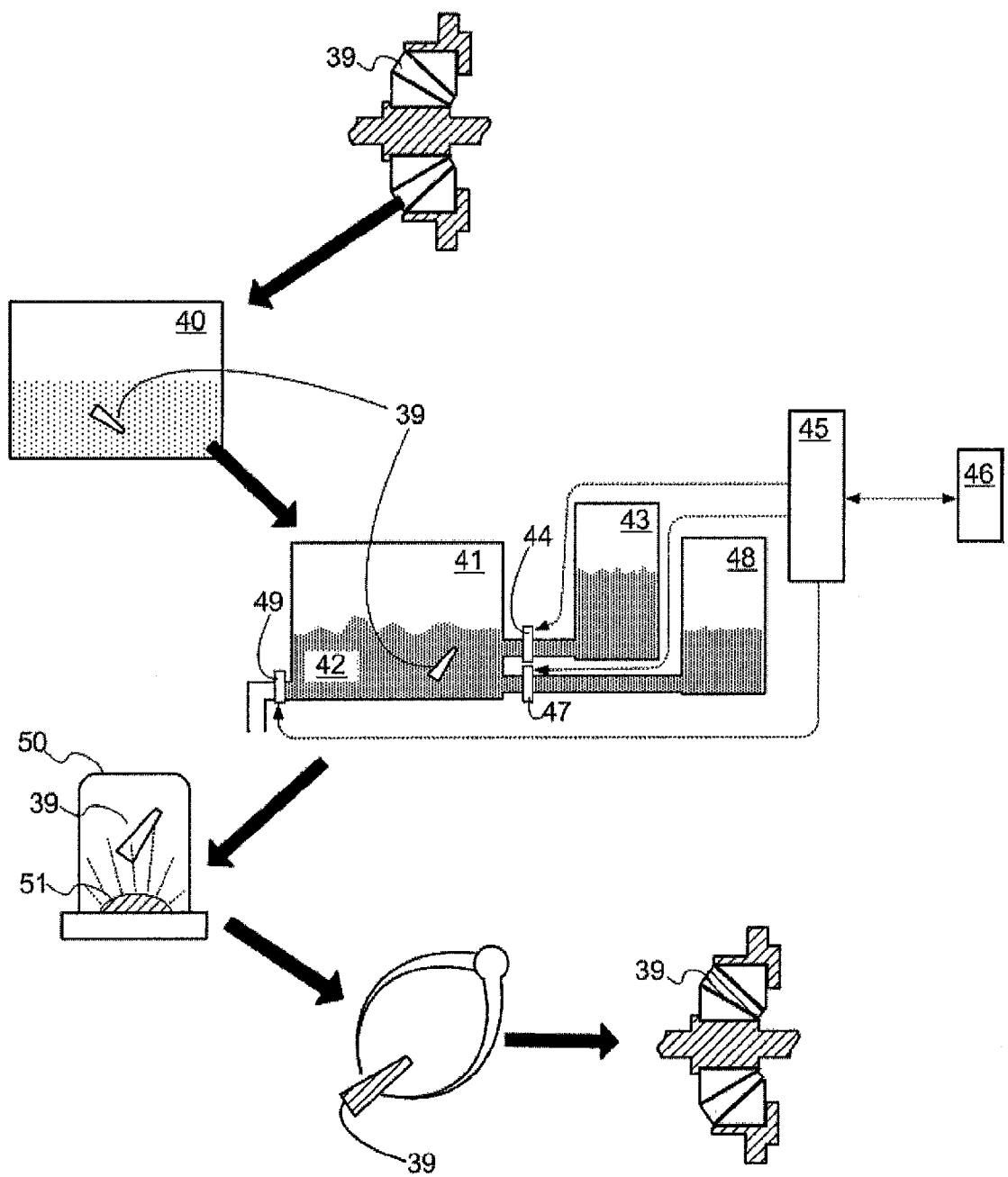
FIG. 5 is a staged structural diagram showing treatment stages and associated apparatus in an embodiment of the disclosed principles.

Having discussed the two-cycle refinishing procedure in overview, the details of the processing are shown in the flow chart 20 of FIG. 4 with reference to the apparatus of FIG. 5. At stage 21, a roller element 39 is initially installed in a bearing assembly such as that shown in FIG. 1 for use in a non-isotropically finished and non-coated condition. At approximately 75% of its useful life, the roller element 39 is removed from the bearing assembly at stage 22. The percentage of useful life may be measured, for example, via inspection, or may be inferred, for example, based on a known average useful life for the type of element. It will be appreciated that the percentage of useful life before removal need not be precisely 75%, and in an embodiment, a percentage other than 75% is used as a point at which the element is removed. Thus, for example, in various embodiments, removal occurs at a substantial percentage of useful life, e.g., from 50% to 80% of useful life.

At stage 23, the removed roller element 39 is cleaned, e.g., via degreasing in an appropriate solvent. Because of its prior use, the roller element 39 may have surface defects such as pitting and/or galling. Thus, at stage 24, the used roller element 39 may be machined or abraded to remove large surface irregularities. For example, in the case of spherically uniform roller elements such as ball bearings, the roller element 39 may be barrel finished in appropriate media at this stage as described above in a tumbling container 40 (FIG. 5).

The roller element 39 is then subjected to acid resurfacing at stage 25, as described above, wherein the roller element 39 is submerged in a cutting fluid mixture of an appropriate acid such as phosphoric or oxalic acid, with a pH value between about 5 and about 6 as described above. The acid resurfacing may be executed in a processing tank 41 separate from the tumbling container 40. The cutting fluid 42 may be introduced into the processing tank 41 from a cutting fluid reservoir 43 via an electronically controlled cutting fluid valve 44 under the control of a refinishing processor 45. The refinishing processor 45 includes a digital microcomputer or microprocessor associated with a nontransitory computer-readable digital memory 46 containing computer-executable code for controlling the behavior of the refinishing processor 45. An agitator or other flow enhancement means, not shown, may also be used to speed processing in the processing tank 41.

The cutting process proceeds by removing the asperities, i.e., high points, in the surface of the roller element 39, while elements in the solution protect the low points. In this way, asperities become broadened and lowered to an extent that the irregularities eventually become sufficiently minor and isotropic as measured in the manner described above.

Once the surface cutting step of stage 25 is complete, the surface of the roller element 39 is burnished in an embodiment. In particular, a burnishing solution, e.g., a slip agent having a pH of about 7 to about 9, is flowed over the roller element 39 at stage 26. In an embodiment, the cutting fluid is drained prior to introduction of the burnishing solution, but in an alternative embodiment the burnishing solution itself is used to displace the cutting fluid. In operation, the electronically controlled cutting fluid valve 44 from the cutting fluid reservoir 43 via is closed, while an electronically controlled evacuation valve 49 is opened to drain the processing tank 41. Contemporaneously, an electronically controlled burnishing solution valve 47 from a burnishing solution tank 48 is opened to admit the burnishing solution into the processing tank 41.

The burnishing solution operates to further smooth the part and also to neutralize the cutting fluid to avoid continued cutting. After burnishing of the roller element 39, the roller element 39 is rinsed at stage 27 to prevent any further etching or erosion.

At stage 28, the roller element 39 is coated with a hardened coating such as a carbon-containing coating or film. The coating may be any suitable material, but in an embodiment the coating is tungsten carbide (WC). In general, the coating is preferably a diamond-like carbon coating (DLC). Examples of DLC include hydrogenated (C:H) or hydrogen free amorphous DLC, tetrahedral carbon (ta-C) coating and DLC doped with a transition metal element such as titanium, chromium and/or tungsten. The DLC may be doped with an element such as silicon to enhance its friction reduction properties.

The coating may be applied via physical vapor deposition (PVD), chemical vapor deposition (CVD) or hybrid processes. In the case of vapor deposition, the roller element 39 is placed in a vacuum chamber 50 adjacent a heated mass of coating material, e.g., a tungsten carbide block 51 or rod. As the source material vaporizes, the freed molecules impinge the roller element 39 and plate it. With respect to electrofluidic deposition, source material molecules in solution are electrically attracted to the submerged roller element 39, depositing a layer of coating material thereon.

The processed reconditioned roller elements are optionally measured at stage 29 to ensure surface smoothness and suitability for use. If any roller element is found not to have the requisite surface smoothness, it may be discarded or reprocessed at stage 30. Otherwise, at stage 31, the roller element is reinstalled into the bearing assembly (or type of bearing assembly) from which it was removed. It is generally not necessary to ensure that reconditioned roller elements are reinstalled in precisely the same assembly from which they came.

INDUSTRIAL APPLICABILITY

In general terms, the present disclosure sets forth a system and method applicable to providing initially non-IF and uncoated bearing rolling elements and other parts with a lifetime substantially equal to the lifetime of initially IF finished and protection-coated parts. The described process unexpectedly yields a wear curve that is even more shallow than that of an initially IF finished and protection-coated part. In addition, an unexpectedly large increase in overall lifetime is provided.

The described processing of partially used roller elements and other parts can be performed on the used field return parts to provide an increase in cycles to failure over that of the original parts. Initial lab tests verify that for parts run to 75% of predicted life, the described process extends such parts' fatigue life beyond the normal cycles to failure of the non-IF uncoated parts.

From a logistical standpoint, the described process also provides supply chain stability. For example, it allows reconditioning and remanufacturing facilities to reuse large bearings, e.g., final drive bearings, for which new parts have become unavailable due to supplier instability or other issues.

Moreover, even for smaller bearings and bearing assembly components, the described process may yield a cost savings compared to both replacement and reuse. As to the latter, simple reuse of a partially used element such as a bearing roller is economical in the near-term, but increases costs in the long-term due to accelerated tear-down costs and associated down time of the affected machine or system.

It will be appreciated that the present disclosure provides a system and method for extending the life of bearing elements and of decreasing the slope of element wear curves relative to both untreated and initially treated elements. While only certain embodiments have been set forth, alternatives and modifications will be apparent from the above description to those of skill in the art. These and other alternatives are considered equivalents and within the spirit and scope of this disclosure and the appended claims.

What is claimed is:

1. A method for processing a component of a first bearing assembly, the component having an initial useful life, the method comprising:
    using the component in an initially non-isotropically finished and uncoated condition in the bearing assembly for less than about 75% of the initial useful life;
    removing the component from the bearing assembly;
    treating the removed component by
        subjecting a surface of the removed component to isotropic finishing, and applying a protective wear coating to the surface of the component after isotropic finishing;
        wherein the treated component exhibiting a rate of wear that is lower than a rate of wear exhibited by an initially isotropically finished and coated component; and
    installing the treated component into a second bearing assembly.

2. The method for processing a component of a first bearing assembly in accordance with claim 1, wherein the component is a rolling element that is one of a ball, roller, and needle.

3. The method for processing a component of a first bearing assembly in accordance with claim 1, wherein the component is a bearing race.

4. The method for processing a component of a first bearing assembly in accordance with claim 1, wherein applying a protective wear coating to the surface of the component after isotropic finishing includes applying the protective wear coating via one of vapor deposition and fluid deposition.

5. The method for processing a component of a first bearing assembly in accordance with claim 1, wherein the first bearing assembly and the second bearing assembly are the same assembly.

6. The method for processing a component of a first bearing assembly in accordance with claim 1, wherein using the component in the bearing assembly for less than about 75% of the initial useful life comprises using the component in the bearing assembly for about 50% of the initial useful life.

7. The method for processing a component of a first bearing assembly in accordance with claim 1, wherein using the component in the bearing assembly for less than about 75% of the initial useful life comprises using the component in the bearing assembly for between about 50% and less than about 75% of the initial useful life.

8. The method for processing a component of a first bearing assembly in accordance with claim 1, wherein subjecting the removed component to isotropic finishing comprises applying a cutting fluid to the surface of the component to yield an isotropic surface finish.

9. The method for processing a component of a first bearing assembly in accordance with claim 8, wherein the cutting fluid has a pH of about 5 to about 6.

10. The method for processing a component of a first bearing assembly in accordance with claim 8, wherein subjecting the removed component to isotropic finishing further comprises applying a burnishing solution to the surface of the component.

11. The method for processing a component of a first bearing assembly in accordance with claim 10, wherein the burnishing solution has a pH of about 7 to about 9.

12. A method for extending a useful life of a partially-used component of a bearing assembly, comprising:
    providing the partially-used component in an initially non-isotropically finished and uncoated condition and having an initial useful life that is less than a useful life of an initially isotropically finished and coated component;
    treating the partially-used component by
        subjecting a surface of the partially-used component to isotropic finishing, and
        applying a protective wear coating to the surface of the partially-used component; and
    wherein the treated component having an overall useful life that is substantially equal to the useful life of the initially isotropically finished and coated component.

13. The method for extending a useful life of a partially-used component of a bearing assembly in accordance with claim 12, wherein the partially-used component has been used for more than about 50% of the initial useful life.

14. The method for extending a useful life of a partially-used component in accordance with claim 12, wherein the component is a rolling element that is one of a ball, roller, and needle.

15. The method for extending a useful life of a partially-used component in accordance with claim 12, wherein the component is a bearing race.

16. The method for extending a useful life of a partially-used component in accordance with claim 12, wherein subjecting the removed component to isotropic finishing comprises applying a cutting fluid to the surface of the component to yield an isotropic surface finish, wherein the cutting fluid has a pH of about 5 to about 6.

17. The method for extending a useful life of a partially-used component in accordance with claim 16, wherein subjecting the removed component to isotropic finishing further comprises applying a burnishing solution to the surface of the component, wherein the burnishing solution has a pH of about 7 to about 9.

* * * * *